United States Patent [19]

Koshoji et al.

[11] Patent Number: 5,057,218
[45] Date of Patent: Oct. 15, 1991

[54] POROUS MEMBRANE AND PRODUCTION PROCESS THEREOF

[75] Inventors: Toshinobu Koshoji; Hironari Honda; Kiyonobu Okamura; Kunio Misoo; Osamu Nishimura, all of Toyohashi, Japan

[73] Assignee: Mitsubishi Rayon Co., Ltd., Tokyo, Japan

[21] Appl. No.: 551,021

[22] Filed: Jul. 11, 1990

[30] Foreign Application Priority Data

Jul. 13, 1989 [JP] Japan .................................. 1-181556
Apr. 16, 1990 [JP] Japan .................................. 2-099998

[51] Int. Cl.$^5$ .............................................. B01D 39/00
[52] U.S. Cl. ........................... 210/500.35; 210/500.36; 210/500.23; 264/209.5; 264/210.8
[58] Field of Search ....................... 210/500.23, 500.35, 210/500.36; 264/209.5, 210.8

[56] References Cited

U.S. PATENT DOCUMENTS

| | | | |
|---|---|---|---|
| 4,220,543 | 9/1980 | Yamashita | 210/500.35 |
| 4,346,142 | 8/1982 | Lazear | 428/315.7 |
| 4,439,322 | 3/1984 | Sonoda et al. | 210/500.35 |
| 4,459,210 | 7/1984 | Murakami et al. | 210/500.35 |
| 4,713,292 | 12/1987 | Takemura et al. | 210/500.35 |
| 4,802,942 | 2/1989 | Takemura et al. | 210/500.35 |

FOREIGN PATENT DOCUMENTS

0068509 5/1983 European Pat. Off. .

OTHER PUBLICATIONS

Chemical Abstracts, vol. 105, No. 12, Sep. 22, 1986, Columbus, Ohio, U.S.A., p. 45; ref. No. 98566Y; & JP-A-61 019 650 (Daiichi Kogyo Seiyaku Co., Ltd.) 28-01-1987 *Abstract*.

*Primary Examiner*—Morton Foelak
*Attorney, Agent, or Firm*—Oblon, Spivak, McClelland, Maier & Neustadt

[57] ABSTRACT

Disclosed is a porous membrane comprising (1) a hydrophilic copolymer X composed principally of (poly)alkylene glycol mono(meth)acrylate units A and ethylene units B and (2) a polyolefin Y, the (poly)alkylene glycol mono(meth)acrylate units A being of the formula

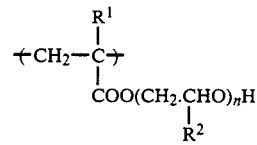

where $R^1$ and $R^2$ independently represent hydrogen or methyl, and n has a value in the range of 1 to 9. This porous membrane has permanent hydrophilicy suitable for the treatment of water-based liquids and can be produced by an industrially advantageous process. This process comprises melt-forming a blend of (1) a hydrophilic copolymer X composed principally of (poly)alkylene glycol mono(meth)acrylate units A and ethylene units B and (2) a polyolefin Y; heat-treating the melt-formed product in a vacuum or an inert gas medium at a temperature not higher than the melting point of polyolefin Y for a period of an hour or more; and stretching the heat-treated, melt-formed product to make it porous.

6 Claims, No Drawings

POROUS MEMBRANE AND PRODUCTION PROCESS THEREOF

BACKGROUND OF THE INVENTION

1. Field of the Invention

This invention relates to hydrophilic porous membranes suitable for filtering and separating purposes in medical and industrial fields, and to a production process thereof.

2. Description of the Prior Art

Porous membranes are being used in medical applications including the separation of blood plasma, the filtration of infusion fluids, the separation of plasma proteins, the preparation of sterile water, and the like, as well as in industrial applications including the preparation of IC washing water and food processing water, the purification of other process water, and the like.

In recent years, large amounts of porous membranes have come to be utilized in water treatment devices for use in applications other than those described above, such as water purifiers for home and restaurant use.

In these applications, the dissolving-out of foreign matter from the material of the porous membrane would impair its safety or degrade the quality of the purified water or aqueous solution. Accordingly, there is a strong demand for porous membranes precluding the possibility of such dissolving-out of foreign matter.

A variety of porous membranes made of different materials and having different porous structures have been proposed. Among others, attention is now focused on porous membranes produced by melt-forming a crystalline thermoplastic polymer into a hollow fiber, tube or film, stretching the melt-formed product at a relatively low temperature to develop crazes in the amorphous regions between crystalline lamellae, and then hot-stretching the melt-formed product to create a porous structure therein. Since no additive or solvent is used, these porous membranes are suitable for use in applications prohibiting the dissolving-out of impurities and compounds therefrom. Hollow fiber membranes of this type are disclosed in Japanese Patent Laid-Open Nos. 137026/'77, 42919/'82 and 66114/'82, and flat films of this type are disclosed in U.S. Pat. No. 3,679,538 and Japanese Patent Publication No. 32531/'80.

Since porous membranes produced by the above-described processes consist solely of a polyolefin or fluorinated polyolefin that is essentially hydrophobic, it is difficult to use them directly for the purpose of filtering water-based liquids such as aqueous solutions. Accordingly, these porous membranes are usually used for the filtration of water-based liquids after being treated with hydrophilizing agents such as alcohols and surfactants.

One method for hydrophilizing hydrophobic membranes is disclosed in Japanese Patent Laid-Open No. 38333/'81. According to this method, a hydrophobic membrane is coated with a hydrophilic organic hydrocarbon monomer such as acrylic acid, methacrylic acid or vinyl acetate, and then exposed to ionizing radiation in a dose of about 1 to 10 megarads to fix the monomer chemically.

Another method for producing hydrophilic porous hollow fibers is disclosed in Japanese Patent Laid-Open No. 137208/'80. According to this method, a blend of two different polymers is melt-spun to form hollow fibers, which are stretched to cleave the interface between the different polymers. The resulting microporous hollow fibers are subjected to an after-treatment such as hydrolysis or sulfonation of the side-chain groups present in the constituent polymers. Thus, there are obtained hydrophilic porous hollow fibers having hydrophilized pore surfaces.

However, the hydrophilic porous membranes produced by the above-described methods have the following disadvantages.

Hydrophilizing treatment with an alcohol or a surfactant provides only tentative hydrophilization. Moreover, if the porous membrane having the hydrophilizing agent attached thereto is used for filtering or other purposes, the alcohol or surfactant migrates to and contaminates the purified water. Accordingly, it is necessary to wash off the hydrophilizing agent thoroughly before use. On this occasion, the pore surfaces will regain hydrophobicity if the washed porous membrane is dried. Thus, once the porous membrane is hydrophilized, it is necessary to replace the hydrophilizing agent with water and thereby keep its pore surfaces in contact with the water.

The method disclosed in Japanese Patent Laid-Open No. 38333/'81 can provide permanent hydrophilicity to the porous membrane, because the groups developing hydrophilicity are chemically fixed to the porous membrane. However, the need of exposure to ionizing radiation requires large-scale equipment, involves rather low process stability, and has a possibility of damage to the membrane material. Thus, it is difficult to manage and In the method disclosed Japanese Patent Laid-Open control the process steps.

In the method desclosed Japanese Patent Laid-Open No. 137208/'80, the hollow fibers produced by melt-spinning a blend of different polymers and then stretching the spun fibers to make them porous generally have low porosity. Moreover, this method requires an after-treatment for hydrophilization, such as hydrolysis or sulfonation, which makes the process complicated.

SUMMARY OF THE INVENTION

It is an object of the present invention to provide a polyolefin-based porous membrane which has permanent hydrophilicity suitable for the treatment of water-based liquids and can be produced by an industrially advantageous process.

It is another object of the present invention to provide an industrially advantageous process for the production of polyolefin-based porous membranes having permanent hydrophilicity suitable for the treatment of water-based liquids.

In order to accomplish the above objects, the present invention provides a porous membrane comprising (1) a hydrophilic copolymer X composed principally of (poly)alkylene glycol mono(meth)acrylate units A and ethylene units B; and (2) a polyolefin Y, the (poly)alkylene glycol mono(meth)acrylate units A being of the formula:

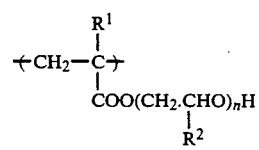

where $R^1$ and $R^2$ independently represent hydrogen or methyl, and n represents the average polymerization degree of the alkylene glycol units in hydrophilic copolymer X and has a value in the range of 1 to 9.

The present invention also provides a process for the production of porous membranes which comprises the steps of (a) melt-forming a blend of (1) a hydrophilic copolymer X composed principally of (poly)alkylene glycol mono(meth)acrylate units A of the above formula and ethylene units B and (2) a polyolefin Y;

(b) heat-treating the melt-formed product in a vacuum or an inert gas medium at a temperature not higher than the melting point of polyolefin Y for a period of an hour or more; and (c) stretching the heat-treated, melt-formed product obtained through step (b) to make it porous.

The porous membranes of the present invention are naturally hydrophilic and can therefore be used as separating membranes in various fields including medical treatment, food processing industry and drinking water supply. In the case of porous membranes having a porous structure in which pores are formed by lamellae and a large number of fibrils interconnecting the lamellae, the pores intercommunicating anywhere from one surface to the other surface of the membrane, they exhibit excellent mechanical strength because they, on the whole, have a high degree of longitudinal orientation. Moreover, they have a network structure in which pores intercommunicate three-dimensionally, and are hence effective in retarding clogging of the membrane during use.

The process of the present invention makes it possible to impart hydrophilicity to polyolefin porous membranes in a simple manner and thereby produce hydrophilic porous membranes without using any solvent or additive.

DETAILED DESCRIPTION OF THE INVENTION AND PREFERRED EMBODIMENTS

As described above, the porous membranes of the present invention comprise (1) a hydrophilic copolymer X composed principally of (poly)alkylene glycol mono(meth)acrylate units A of the above formula and ethylene units B, and (2) a polyolefin Y.

The polyolefins which can be used as one component of the porous membranes of the present invention include polyethylene, polypropylene, poly-3-methylbutene-1, poly-4-methylpentene-1 and copolymers thereof.

In (poly)alkylene glycol mono(meth)acrylate units A contained in hydrophilic copolymer X constituting the porous membranes of the present invention, the value of n represents the average polymerization degree of the alkylene glycol units present in units A of hydrophilic copolymer X (i.e., the average number of oxyalkylene groups). The value of n is in the range of 1 to 9.

The value of n can be calculated by measuring the polymerization degrees of the alkylene glycol units in units A using gel permeation chromatography.

If n is greater than 9, polyalkylene glycol mono(meth)acrylate used as a component for the introduction of units A (hereinafter referred to as "A-component") becomes so viscous that it is difficult to react A-component uniformly with ethylene used as a component for the introduction of units B (hereinafter referred to as "B-component") and, therefore, it is impossible to obtain any hydrophilic copolymer X.

Where n ranges from 1 to 2, high reactivity can be achieved between the component for the introduction of units A and the component for the introduction of ethylene units, making it possible to industrially produce a hydrophilic copolymer X showing little variation in quality. Thus, there can be obtained hydrophilic porous membranes having little water-soluble matter.

In hydrophilic copolymer X, various units A differing in the polymerization degree of the alkylene glycol units contained therein and in the types of $R^1$ and $R^2$ may be present in admixture. For example, oxyethylene blocks and oxypropylene blocks may be present in admixture.

In hydrophilic copolymer X, no particular limitation is placed on the ratio between units A and B. However, the content of units A is preferably in the range of 10 to 80% by weight, i.e. A/B ranges from 10/90 to 80/20 by weight, for reasons given below. Specifically, if the content of units A is less than 10% by weight, the resulting porous membrane does not have sufficient hydrophilicity. On the other hand, if the content of units A is greater than 80% by weight, hydrophilic copolymer X itself generally contains large amounts of very-low-molecular-weight components and, therefore, tends to dissolve out from the porous membrane formed of a blend of this hydrophilic copolymer X and polyolefin Y. In order to obtain a porous membrane having sufficieint hydrophilicity, the content of units A is more preferably in the range of 70 to 15% by weight and most preferably in the range of 70 to 40% by weight.

No particular limitation is placed on the molecular weight of hydrophilic copolymer X. However, in order to obtain a porous membrane exhibiting permanent hydrophilicity, hydrophilic copolymer X preferably has a relatively high molecular weight. More specifically, it preferably has an intrinsic viscosity $[\eta]$ of about 0.07 to 0.40 dl/g as measured in xylene at 75° C. If the value of $[\eta]$ is below the lower limit of this range, hydrophilic copolymer X tends to bleed out during use. On the other hand, if the value of [n] is above the upper limit of the aforesaid range, hydrophilic copolymer X has such low fluidity that the proportion of hydrophilic copolymer X present in the surfaces of the porous membrane, inclusive of the pore surfaces thereof, tends to be lower.

Basically, hydrophilic copolymers X can be prepared by reacting A-component with B-component. However, hydrophilic copolymer X may contain a third type of units in addition to units A and B, provided that they are present in such an amount as not to impair the hydrophilicity or other intended properties of the resulting porous membrane. Examples of the third type of units include ethylenically unsaturated monomer units C derived from an ethylenically unsaturated carboxylic acid ester, an ethylenically unsaturated vinyl ester or an ethylenically unsaturated carboxylic acid. Units C may be present in an amount of about 1 to 40 parts by weight, preferably 1 to 10 parts by weight, per 100 parts by weight of units A and B.

In the porous membranes of the present invention, no particular limitation is placed on the . proportion of hydrophilic copolymer X to polyolefin Y. It can be determined so that the resultant porous membrane has the intended hydrophilicity or so that its easy production is performed. Generally, when the content of units A (as a hydrophilic component) in hydrophilic copolymer X is high, the resulting porous membrane exhibits sufficient hydrophilicity even if the content of hydrophilic copolymer X in the porous membrane is low. However, when the content of units A is low, the content of hydrophilic copolymer X in the porous membrane must be increased in order to impart sufficient hydrophilicity to the porous membrane.

Where a melt forming/stretching process is employed to produce porous membranes, the amounts of hydrophilic copolymer X and polyolefin Y used can be determined in consideration of the fact that, if hydrophilic copolymer X has a high content of units A, the growth of lamellar crystals in the melt-formed product is inhibited by using a large amount of hydrophilic copolymer X in the starting polymer blend, whereas if hydrophilic copolymer X has a low content of units A, the growth of lamellar crystals in the melt-formed product is scarcely inhibited by using a large amount of hydrophilic copolymer X in the starting polymer blend.

Moreover, in the case of porous membranes produced by this process, the content of polyolefin Y in the porous membrane is preferably in the range of about 50 to 95% by weight, i.e. X/Y ranges from 5/95 to 50/50 by weight. If the content of polyolefin Y is less than the lower limit of this range, it becomes difficult to grow lamellar crystals fully in the melt-formed product. Thus, it becomes difficult to obtain a membrane having an excellent porous structure.

No particular limitation is placed on the porosity, pore diameter and membrane thickness possessed by the porous membranes of the present invention. However, the porosity may usually be in the range of about 40 to 80%, the pore size in the range of about 0.01 to 3 $\mu$m as measured with a mercury porosimeter, and the membrane thickness in the range of about 10 to 200 $\mu$m. In the case of porous membranes having the form of hollow fibers, the inner diameter thereof may usually be in the range of about 50 to 2,000 $\mu$m.

The porous structure may be such that pores intercommunicate three-dimensionally. Porous membranes having such a porous structure include, for example, ones produced by melt-forming a polymer blend and then stretching the melt-formed product to make it porous, and ones produced by melt-forming a polymer blend containing a substance to be leached and then subjecting the melt-formed product to a leaching treatment. However, porous membranes having a porous structure in which intercommunicating pores are formed by lamellae and a large number of longitudinally oriented fibrils interconnecting the lamellae are especially preferred, because they have high mechanical strength and can retard the increase of pressure loss by clogging.

The process for the production of porous membranes in accordance with the present invention will be described hereinafter.

The porous membranes of the present invention can be produced according to various methods including the wet process for producing porous membranes and the process for producing porous membranes by a combination of melt forming and leaching. Among others, the so-called stretching process based on a combination of melt forming and stretching (to make the melt-formed product porous) is preferred in consideration of the fact that this process enables porous membranes to be produced at low cost on an industrial scale.

The process for the production of porous membranes in accordance with the present invention using the stretching process comprises the steps of:

(a) melt-forming a blend of (1) a hydrophilic copolymer X composed principally of units A and units B and (2) a polyolefin Y;

(b) heat-treating the melt-formed product in a vacuum or an inert gas medium at a temperature not higher than the melting point of polyolefin Y for a period of an hour or more; and (c) stretching the heat-treated, melt-formed product resulted through step (b) to make it porous.

First, the above-described polyolefin Y and hydrophilic copolymer X are blended in a sufficiently intimate manner. Useful blending methods include the method in which the polymers are blended by means of a suitable blender such as V-type blender, and the method in which the polymers are melt-blended in a melt extruder and then pelletized.

Next, in step (a), the resulting polymer blend is melt-formed by using an ordinary melt extruder for the formation of films or hollow fibers. Useful spinning nozzles for the formation of hollow fibers include ones having a double-tubular construction or a horseshoe shape. The former can produce a formed product of substantially uniform cross section. As the film extruder, there may be used either a T-die extruder or a double-tubular die extruder. A double-tubular die extruder produces a tubular film, which can be directly subjected to a subsequent stretching step. Moreover, a film having a desired thickness and width can be formed by controlling the amount of air blown into the tubular film.

In producing the porous membranes of the present invention, the extrusion temperature suitable for stable formation of an unstretched melt-formed product may be suitably determined within a range which can give the desired thickness and width of the melt-formed product consistently, with due consideration for such conditions as the types of polymers used, melt index, extrusion rate, cooling conditions and take-up speed. Usually, the melt forming is performed in a temperature range which is higher than the melting point of polyolefin Y (hereinafter referred to as Tm) by 20° C. or more and does not exceed (Tm+100° C.). If the melt forming is performed at a temperature below the lower limit of this temperature range, the resulting unstretched melt-formed product is highly oriented, but the maximum amount of stretching achievable in the subsequent stretching step for making it porous is reduced and it is difficult to obtain a porous membrane having sufficiently high porosity. On the other hand, if the melt forming is performed at a temperature above the upper limit of the aforesaid temperature range, it is also difficult to obtain a porous membrane having high porosity.

Where a hollow fiber is formed, it is preferably melt-spun at a spinning draft of 10 to 10,000, more preferably 1,000 to 10,000, in order to impart a high degree of crystallinity and a high degree of crystal orientation to the unstretched hollow fiber. If the spinning draft is less than 10, the formation of lamellar crystals is not sufficient and the subsequent stretching step may fail to create a desirable porous structure. Preferably, the unstretched hollow fiber formed by melt spinning has an inner diameter of 50 to 2,000 $\mu$m and a brane thickness of 10 to 200 $\mu$m. However, dimensions outside these ranges may be employed as desired.

Where a tubular or flat film is melt-formed, the film is preferably pulled at a draft of 1 to 5,000 and more preferably at a draft of 10 to 2,000. It is also preferable to cool the film rapidly adjust after the die so that the film may be stably pulled by the rollers with which it first comes into contact. For this purpose, an air knife or other cooling device is preferably used.

In the following step (b), the resulting unstretched melt-formed product is annealed under constant-length or relaxed conditions at a temperature lower than Tm, preferably in the range from (Tm-10° C.) to (Tm-30° C.), for a period of an hour or more, in order to enhance its degree of crystallinity. Although longer annealing times are more desirable, it is preferable from the economical viewpoint to employ an annealing time of about 48 hours or less and more preferably in the range of about 3 to 48 hours.

If such a long-time anneal is performed in air, hydrophilic copolymer X deteriorates during the anneal. In the present invention, therefore, the anneal is performed in an inert gas or a vacuum.

After being annealed, the melt-formed product is stretched in step (c) to make it porous. Usually, a stretching procedure comprising a combination of cold stretching and hot stretching is employed. Specifically, the melt-formed product is first cold-stretched at a temperature ranging from about (Tm - 220° C.) to (Tm - 80° C.), preferably from (Tm - 160° C.) to (Tm - 90° C.), and then hot-stretched at a temperature ranging from about (Tm - 60° C.) to (Tm - 5° C.).

Each of these cold-stretching and hot-stretching steps may be performed in two or more stages.

In these stretching steps, the cold-stretching step causes separation of the grain boundaries of the unstretched melt-formed product having a high degree of crystallinity and a high degree of crystal orientation, and the succeeding hot-stretching step causes plastifying stretching of the melt-formed product to develop a stacked microcellular structure. In order to secure the homogeneity of the porous structure and the stability of the production process, it is a technical key point to produce microcracks uniformly in the first cold-stretching step. If the hot-stretching temperature is higher than the upper limit of the aforesaid range the stretched melt-formed product becomes transparent and fails to develop the desired porous structure. If the hot-stretching temperature is lower than the lower limit of the aforesaid range, the porosity becomes lower as the temperature is reduced.

The amounts of cold stretching and hot stretching may be suitably determined according to the quality characteristics (such as porosity) of the desired porous membrane. However, the amount of cold stretching is preferably in the range of 5 to 100%, and the amount of hot stretching is preferably determined so that the total amount of stretching (achieved by both cold stretching and hot stretching) is in the range of 150 to 700%. If the total amount of stretching exceed 700%, breakage of the melt-formed product may frequently occur during the stretching operation. The polyolefin-based porous membrane thus obtained has substantial morphological stability as a result of hot stretching. If desired, however, the porous membrane may be thermally set under strained or partially relaxed conditions at a temperature ranging from (Tm - 60° C.) to (Tm - 5° C.) by a singlestage- or multistage-treatmemt using dry heat or wet heat A variety of porous membranes having different pore sizes and porosities can be obtained by varying the conditions (such as temperature and stretching ratio) employed for cold stretching and hot stretching.

Moreover porous membranes thus obtained can be treated with heated water or steam at a temperature ranging from about 50° C. to 120° C. in order to enhance their hydrophilicity.

The present invention is further illustrated by the following examples.

In these examples, the degree of crystallinity of the polymer blend was determined by integrating the diffracted light intensities in all directions with a wide-angle X-ray diffractometer and calculating the degree of crystallinity from the following equation.

Degree of crystallinity $(Xc)$ = [(Integrated value of all diffracted light intensities) − (Integrated value of diffracted light intensities in amorphous portions)]/(Integrated value of all diffracted light intensities)

The degree of crystal orientation was determined by measuring the diffracted light intensity in the (110) plane with a wide-angle X-ray diffractometer, obtaining the half-value width of its distribution in the axial direction of the fiber or the MD direction of the film, and calculating the degree of crystal orientation from the following equation.

Degree of crystal orientation = $(H_{(110)})/(180 - H_{(110)}) \times 100$ (%)

where $H_{(110)}$ is the half-value width in the (110) plane.

The contents of units A & B in hydrophilic copolymer X were calculated based on quantitive analysis of oxygen in the hydrophilic copolymer X using elementary analysis.

The value of the average polymerization degree (n) of the alkylene glycol units in units A was calculated by measuring polymerization degrees of the alkylene glycol units in units A using gel permeation chromatography.

EXAMPLE 1

Using an autoclave type reactor having a capacity of 2 liters, hydroxyethyl methacrylate (A-component) was reacted with ethylene (B-component) to obtain an ethylene-hydroxyethyl methacrylate copolymer (n=1) as a hydrophilic copolymer (X). This copolymer had a hydroxyethyl methacrylate content of 55% by weight and an instrinsic viscosity $[\eta]$ of 0.18 dl/g as measured in xylene at 75° C.

This hydrophilic copolymer (X) and high-density polyethylene, as polyolefin (Y), having a density of 0.965 g/cm$^3$ (Mitsubishi Polyethy JX-20, a product of Mitsubishi Petrochemical Co., Tm=133° C.) were mixed in a weight ratio of 20:80. This mixture was melt-blended in a melt extruder, pelletized and then dried.

Then, using a hollow fiber-forming nozzle having a double-tubular construction with an extruding port diameter of 28 mm and an annular slit width of 3.5 mm, the above pellets were spun with air introduced self-suckingly into the bore of the hollow fiber. This spinning was carried out at a spinning temperature of 170° C., a spinning draft of 3,400, and a spinning speed of 200 m/min. The spun fibers were wound on a bobbin.

The resulting unstretched fibers were heat-treated at 120° C. for 24 hours under constant-length conditions in an atmosphere of nitrogen. These unstretched fibers had a degree of crystallinity of 62% and a degree of crystal orientation of 72%. Subsequently, the unstreteched fibers were cold-stretched at 25° C. to an amount of stretching of 80% and then hot-stretched in a box having a length of 2 meters and heated at 115° C. until the total amount of stretching reached 400%. Thereafter, the stretched fibers were thermally set under relaxed conditions in a box having a length of 2 meters and heated at 115° C., so as to give a total amount of stretching of 300%. Thus, there were obtained porous hollow fiber membranes. These porous hollow fiber membranes were fed into a water bath of 90° C. for 5 minutes and dried in an air.

It was observed that the above hollow fiber membranes had a porous structure in which slit-like openings were formed by fibrils oriented in the axial direction of the fiber and crystalline lamellae interconnecting the fibrils. This porous structure extended almost uniformly anywhere from the outer surface to the inner surface of each of the fibers. The slit-like openings formed between fibrils and lamellae had a length of about 1.1 μm and a width of about 0.08 μm.

These hollow fiber membranes had an inner diameter of 258 μm, a thickness of 54 μm and a porosity of 62%. Their water penetration pressures (i.e., the water pressure at which water fed from the inside of the hollow fiber emerges evenly from the outer surface thereof) were 0.1 kg/cm$^2$, respectively, indicating that the hollow fiber membranes had good hydrophilicity.

Incidentally, porous hollow fiber membranes which were not fed into a water bath of 90° C. showed a water penetration pressure of 0.3 kg/cm$^2$.

EXAMPLES 2–4

The procedure of Example 1 was repeated except that the contents of ethylene and hydroxyethyl methacrylate were different and the hollow fiber membranes shown in Table 1 were obtained.

EXAMPLE 5

Using an autoclave type reactor having a capacity of 2 liters, hydroxyethyl methacrylate (A-component), ethylene (B-component) and vinyl acetate (C-component) were reacted to obtain an hydrophilic copolymer (X) (n=1). The contents of A-component, B-component and C-component in this copolymer were 53 parts, 57 parts and 1.2 parts by weight, respectively. This copolymer had an instrinsic viscosity [η] of 0.19 dl/g as measured in xylene at 75° C.

Using this copolymer instead of the ethylenehydroxyethyl methacrylate, the procedure of Example 1 was repeated to obtain hollow fiber membranes.

EXAMPLE 6

The procedure of Example 5 was repeated except that the contents of A-component, B-component and C-component in the copolymer were 45 parts, 55 parts and 1.2 parts by weight, respectively, and the porous hollow fiber membranes shown in Table 1 were obtained.

EXAMPLE 7

A hydrophilic copolymer (X) composed of 45% by weight of polyethylene glycol monomethacrylate units (units A) in which the polyethylene glycol units had an average polymerization degree (n) of 6 and 55% by weight of ethylene units (units B) and having an intrinsic viscosity [η] of 0.15 dl/g as measured in xylene at 75° C., and high-density polyethylene (Mitsubishi Polyethy JX-20) as polyolefin Y were mixed in a weight ratio of 20:80. This mixture was melt-blended in a melt extruder, pelletized and then dried.

Then, using a hollow fiber-forming nozzle used in Example 1, spinning of the resultant pellets was carried out at a spinning temperature of 220° C, a spinning draft of 3,400, and a spinning speed of 200 m/min. The spun fibers were wound on a bobbin.

The resulting unstretched fibers were heat-treated at 115° C. for 24 hours under constant-length conditions in an atmosphere of nitrogen. These unstretched fibers had a degree of crystallinity of 62% and a degree of crystal orientation of 75%. Subsequently, the unstreteched fibers were cold-stretched at 25° C. to an amount of stretching of 80% and then hot-stretched in a box having a length of 2 meters and heated at 115° C. until the total amount of stretching reached 520%. Thereafter, the stretched fibers were thermally set under relaxed conditions in a box having a length of 2 meters and heated at 115° C., so as to give a total amount of stretching of 400%. Thus, there were obtained porous hollow fiber membranes.

The same porous structure a that of Example 1 was observed in these porous hallow fiber membranes.

EXAMPLE 8

The procedure of Example 7 was repeated except that the hydrophilic copolymer (X) and the polyethylene (Y) were mixed in a ratio of 15:85. Thus, there was obtained hollow fiber membranes having the properties shown in Table 1.

EXAMPLE 9

A hydrophilic copolymer (X) composed of 49 parts by weight of polyethylene glycol monomethacrylate units (units A) in which the polyethylene glycol had an average polymerization degree (n) of 6 and 51 parts by weight of ethylene units (units B) and having an intrinsic viscosity [η] of 0.25 dl/g, and polyethylene (Mitsubishi Polyethy JX-20) as polyolefin Y were mixed in a weight ratio of 20:80. Thereafter, the procedure of Example 7 was repeated to obtain hollow fiber membranes.

These hollow fiber membranes had high porosity and good water permeability.

EXAMPLES 10 and 11

A hydrophilic copolymer (X) composed of 35 parts by weight of polyethylene glycol monomethacrylate units (units A) in which the polyethylene glycol had an average polymerization degree (n) of 6 and 65 parts by weight of ethylene units (units B) and having an intrinsic viscosity [η] of 0.15 dl/g, and polyethylene Mitsubishi Polyethy JX-20) as polyolefin Y were mixed in a weight ratio of 20:80 or 25:75. Thereafter, the procedure of Example 7 was repeated to obtain hollow fiber membranes.

These hollow fiber membranes had high porosity and good water permeability.

EXAMPLE 12

The same hydrophilic copolymer (X) as used in Example 7, and high-density polyethylene having a density of 0.958 g/cm$^3$ and a melt index of 0.35 (Mitsubishi Polyethy. BX-50A, a product of Mitsubishi Petrochemical Co., Tm=131° C.) as polyolefin Y were blended in a weight ratio of 20:80 and then pelletized.

Then, the resulting pellets were fed to a melt extruder provided with a double-tubular die having an extruding port diameter of 60 mm and an annular slit width of 1 mm, and set at an extrusion temperature of 180° C. While a molten tubular film was extruded from the die, air was blown into the tubular film so that its diameter became equal to that of the die. At a position 10 cm above the die, the tubular film was cooled by exposing its entire outer surface to a stream of cooling air having a temperature of 25° C. At a position 100 cm above the die, the tubular film was pulled by nip rolls at a speed of 27 m/min. At this time, the draft was 213. The resulting unstretched film, still in tubular form, was annealed at 115° C. for 24 hours in an atmosphere of nitrogen. This unstretched film had a degree of crystallinity of 58% and a degree of crystal orientation of 77%. Then, the annealed film was cold-stretched between nip rollers maintained at 25° C. so as to give an amount of stretching of 80%. The distance between the rollers was 35 mm. Subsequently, the cold-stretched film was hot-stretched in a box heated at 110° C. until the total amount of stretching reached 400%. Thereafter, the stretched film was thermally set under constant-length conditions for 20 seconds in a box heated at 115° C. Thus, a porous film was produced continuously.

The porous film thus obtained had a thickness of 19 μm and a porosity of 61%. Its water penetration pressure (i.e., the water pressure at which water penetrates from one surface to the other surface of the film) was 0.4 kg/cm².

EXAMPLES 13 and 14

The same hydrophilic copolymer (X) as used in Example 10 and the same polyethylene as used in Example 12 were mixed in a ratio of 20:80 or 25:75.

Thereafter, the procedure of Example 12 was repeated to obtain porous films.

COMPARATIVE EXAMPLE 1

The procedure of Example 7 was repeated except that the hydrophilic copolymer was omitted and the polyethylene (Mitsubishi Polyethy JX-20) alone was used. Thus, there were obtained hollow fiber membranes having the properties shown in Table 1.

COMPARATIVE EXAMPLE 2

The procedure of Example 12 was repeated except that the hydrophilic copolymer was omitted and the polyethylene (Mitsubishi Polyethy BX-50A) alone was used. Thus, there was obtained a porous film having the properties shown in Table 1.

Properties of the porous membranes obtained in the foregoing Examples 1–14 and Comparative Examples 1–2 are summarized in Table 1.

TABLE 1

| Example or Comparative Example No. | Materials of porous membrane | | | | | Properties of porous membrane | | | | | | |
|---|---|---|---|---|---|---|---|---|---|---|---|---|
| | Hydrophilic copolymer (X) | | | Polyolefin (Y) | | Form of membrane | Membrane Thickness (μm) | Inner diameter (μm) | Porosity (%) | Pore size | | Water penetration pressure (kg/cm²) |
| | A/B ratio | [η] (dl/g) | Amount (parts) | Type | Amount (parts) | | | | | Length (μm) | Width (μm) | |
| Example 1 | 55/45 | 0.18 | 20 | Mitsubishi Polyethy JX-20 | 80 | Hollow fiber | 54 | 258 | 62 | 1.1 | 0.08 | 0.1 |
| Example 2 | 45/55 | 0.20 | 20 | Mitsubishi Polyethy JX-20 | 80 | Hollow fiber | 54 | 272 | 58 | 1.1 | 0.08 | 0.1 |
| Example 3 | 39/61 | 0.18 | 20 | Mitsubishi Polyethy JX-20 | 80 | Hollow fiber | 54 | 265 | 58 | 1.3 | 0.08 | 0.2 |
| Example 4 | 33/67 | 0.18 | 24 | Mitsubishi Polyethy JX-20 | 76 | Hollow fiber | 51 | 259 | 55 | 0.9 | 0.07 | 0.3 |
| Example 5 | 53/47 | 0.19 | 20 | Mitsubishi Polyethy JX-20 | 80 | Hollow fiber | 53 | 261 | 61 | 1.1 | 0.08 | 0.1 |
| Example 6 | 45/55 | 0.20 | 20 | Mitsubishi Polyethy JX-20 | 80 | Hollow fiber | 53 | 274 | 59 | 1.3 | 0.09 | 0.1 |
| Example 7 | 45/55 | 0.15 | 20 | Mitsubishi Polyethy JX-20 | 80 | Hollow fiber | 51 | 270 | 57 | 1.1 | 0.08 | 0.1 |
| Example 8 | " | " | 15 | Mitsubishi Polyethy JX-20 | 85 | Hollow fiber | 55 | 272 | 62 | 1.3 | 0.11 | 0.2 |
| Example 9 | 49/51 | 0.25 | 20 | Mitsubishi Polyethy JX-20 | 80 | Hollow fiber | 57 | 272 | 58 | 1.2 | 0.09 | 0.6 |
| Example 10 | 35/65 | 0.15 | 20 | Mitsubishi Polyethy JX-20 | 80 | Hollow fiber | 56 | 275 | 59 | 1.2 | 0.10 | 0.5 |
| Example 11 | " | " | 25 | Mitsubishi Polyethy JX-20 | 75 | Hollow fiber | 50 | 262 | 53 | 0.7 | 0.05 | 0.2 |
| Example 12 | 45/55 | 0.15 | 20 | Mitsubishi Polyethy BX-50A | 80 | Film | 19 | — | 61 | 0.8 | 0.07 | 0.4 |
| Example 13 | 35/65 | 0.15 | 20 | Mitsubishi Polyethy BX-50A | 80 | " | 21 | — | 63 | 0.9 | 0.07 | 0.6 |
| Example 14 | " | " | 25 | Mitsubishi Polyethy BX-50A | 75 | " | 18 | — | 55 | 0.5 | 0.04 | 0.3 |
| Comparative Example 1 | — | — | — | Mitsubishi Polyethy JX-20 | 100 | Hollow fiber | 58 | 285 | 72 | 1.5 | 0.12 | 4.9 |
| Comparative | — | — | — | Mitsubishi | 100 | Film | 24 | — | 72 | 1.1 | 0.09 | 5.4 |

TABLE 1-continued

| Example or Comparative Example No. | Materials of porous membrane | | | | | Properties of porous membrane | | | | | | |
|---|---|---|---|---|---|---|---|---|---|---|---|---|
| | Hydrophilic copolymer (X) | | | Polyolefin (Y) | | Form of membrane | Membrane Thickness ($\mu m$) | Inner diameter ($\mu m$) | Porosity (%) | Pore size | | Water penetration pressure ($kg/cm^2$) |
| | A/B ratio | [$\eta$] (dl/g) | Amount (parts) | Type | Amount (parts) | | | | | Length ($\mu m$) | Width ($\mu m$) | |
| Example 2 | | | | Polyethy BX-50A | | | | | | | | |

What is claimed is:

1. A porous membrane comprising (1) a hydrophilic copolymer X composed principally of (poly)alkylene glycol mono(meth)acrylate units A and ethylene units B and (2) a polyolefin Y, the (poly)alkylene glycol mono(meth)acrylate units A being of the formula

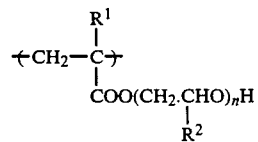

where $R^1$ and $R^2$ independently represent hydrogen or methyl, and n has a value in the range of 1 to 9.

2. A porous membrane as claimed in claim 1 wherein the weight ratio of hydrophilic copolymer X to polyolefin Y ranges from 5/95 to 50/50.

3. A porous membrane as claimed in claim 1 or 2 wherein the weight ratio of units A to units B in hydrophilic copolymer X ranges from 80/20 to 10/90.

4. A porous membrane as claimed in claim 3 wherein hydrophilic copolymer X has an intrinsic viscosity [$\eta$] of 0.07 to 0.40 dl/g as measured in xylene at 75° C.

5. A porous membrane as claimed in any one of claims 1 to 4 wherein the porous structure thereof is such that intercommunicating pores are formed by lamellae and a large number of longitudinally oriented fibrils interconnecting the lamellae.

6. A porous membrane as claimed in any one of claims 1 to 5 wherein polyolefin Y is polyethylene.

* * * * *